United States Patent
Boshra et al.

(10) Patent No.: US 9,135,494 B2
(45) Date of Patent: Sep. 15, 2015

(54) FINGER BIOMETRIC SENSOR FOR FLAGGING AS SUFFICIENT ENROLLMENT FINGER BIOMETRIC DATA SETS AND RELATED METHODS

(71) Applicant: APPLE INC., Cupertino, CA (US)

(72) Inventors: Michael Boshra, Melbourne, FL (US); William M. Vieta, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/021,523

(22) Filed: Sep. 9, 2013

(65) Prior Publication Data

US 2015/0071506 A1    Mar. 12, 2015

(51) Int. Cl.
   *G06K 9/00*    (2006.01)

(52) U.S. Cl.
   CPC .................................. *G06K 9/00013* (2013.01)

(58) Field of Classification Search
   None
   See application file for complete search history.

(56) References Cited

U.S. PATENT DOCUMENTS

| 5,940,526 | A | 8/1999 | Setlak et al. |
| 2005/0129291 | A1* | 6/2005 | Boshra .......................... 382/124 |
| 2006/0182319 | A1* | 8/2006 | Setlak et al. ................... 382/124 |
| 2008/0113685 | A1* | 5/2008 | Ishida et al. ................ 455/556.1 |
| 2010/0315202 | A1* | 12/2010 | Phoha .......................... 340/5.83 |
| 2013/0272586 | A1* | 10/2013 | Russo ............................ 382/124 |

OTHER PUBLICATIONS

"Criterion." Merriam-Webster. Merriam-Webster, n.d. Web. Mar. 31, 2015.*
"Lookup Table." Wikipedia. Wikimedia Foundation, Feb. 14, 2010. Web. Mar. 31, 2015.*
Muhammad, Rashid Bin. "Connectivity." Graph Theory. Kent State University, Mar. 21, 2009. Web. Jul. 7, 2015.*

* cited by examiner

*Primary Examiner* — Chan Park
*Assistant Examiner* — Geoffrey E Summers
(74) *Attorney, Agent, or Firm* — Allen, Dyer, Doppelt, Milbrath & Gilchrist, P.A.

(57) ABSTRACT

A finger biometric sensor may include an array of finger biometric sensing pixels, and processing circuitry coupled to the array of finger biometric sensing pixels. The processing circuitry may be capable of collecting initial enrollment finger biometric data sets and generating an initial enrollment criteria based thereon, collecting at least one additional enrollment finger biometric data set, and adapting the initial enrollment criteria based thereon to define an additional enrollment criteria. The processing circuitry may also be capable of flagging the initial enrollment finger data sets and the at least one additional enrollment finger data set as sufficient if the additional enrollment criteria meets an acceptance condition, and collecting further enrollment finger biometric data and adapting the additional enrollment criteria if the additional enrollment criteria fails to meet the acceptance condition.

21 Claims, 7 Drawing Sheets

FINGER BIOMETRIC SENSOR FOR FLAGGING AS SUFFICIENT ENROLLMENT FINGER BIOMETRIC DATA SETS AND RELATED METHODS

FIELD OF THE INVENTION

The present invention relates to the field of electronics, and, more particularly, to electronic devices including finger biometric sensors and related methods.

BACKGROUND

One type of finger biometric sensor may be characterized by a relatively large sensing area, for example, large enough to acquire finger biometric data in a single capture. It has recently been desirable to make a finger biometric sensor much smaller, for example, to accommodate smaller form factors associated with a mobile wireless communications device, as well as reduce cost.

However, a relatively small finger biometric sensor may have several drawbacks with respect to a larger area finger biometric sensor. For example, one such drawback may be with respect to enrollment. It is generally desirable to capture finger biometric data corresponding to multiple fingerprint images to obtain a sufficient amount of finger biometric data for enrollment. The number of images or amount of finger biometric data sufficient for enrollment generally varies.

SUMMARY

A finger biometric sensor may include an array of finger biometric sensing pixels and processing circuitry coupled to the array of finger biometric sensing pixels. The processing circuitry may be capable of collecting an initial plurality of enrollment finger biometric data sets and generating an initial enrollment criteria based thereon, collecting at least one additional enrollment finger biometric data set and adapting the initial enrollment criteria based thereon to define an additional enrollment criteria. The processing circuitry may also be capable of flagging the initial plurality of enrollment finger data sets and the at least one additional enrollment finger data set as sufficient if the additional enrollment criteria meets an acceptance condition, and collecting further enrollment finger biometric data and adapting the additional enrollment criteria if the additional enrollment criteria fails to meet the acceptance condition. Accordingly, the finger biometric sensor may collect sufficient enrollment finger biometric data sets sufficient for enrollment, while reducing user inconvenience that may be caused by collecting an increased number of enrollment finger biometric data sets.

The processing circuitry may be capable of generating an initial enrollment template based upon the initial plurality of finger biometric data sets and an additional enrollment template based upon the at least one finger biometric data set. The processing circuitry may be capable of performing a match based upon the flagged initial plurality of enrollment finger data sets and the at least one additional enrollment finger data set, for example.

The processing circuitry may be capable of generating the initial enrollment criteria based upon an amount of overlap of the initial plurality of enrollment finger biometric data sets, and adapting the initial enrollment criteria based upon an amount of overlap of the initial plurality of enrollment finger biometric data sets and the at least one additional enrollment finger biometric data set. The processing circuitry may be capable of generating the initial enrollment criteria based upon a predicted false acceptance rate (FAR) of the initial plurality of enrollment finger biometric data sets, and adapting the initial enrollment criteria based upon a predicted false acceptance rate (FAR) of the initial plurality of enrollment finger biometric data sets and the at least one additional enrollment finger biometric data set, for example.

The processing circuitry may be capable of generating the initial enrollment criteria based upon a predicted false rejection rate (FRR) of the initial plurality of enrollment finger biometric data sets. The processing circuitry may also be capable of adapting the initial enrollment criteria based upon a predicted false rejection rate (FRR) of the initial plurality of enrollment finger biometric data sets and the at least one additional enrollment finger biometric data set, for example. The processing circuitry may be capable of generating the initial enrollment criteria based upon a threshold finger surface area, and adapting the initial enrollment criteria based upon a further threshold finger surface area, for example.

The processing circuitry may include a processor and a memory coupled thereto. The memory may be capable of storing the initial plurality of enrollment finger biometric data sets and the at least one additional enrollment data set. The memory may be capable of storing a look-up table. The processor may be capable of generating and adapting the initial enrollment criteria based upon the look-up table stored in the memory. The array of finger biometric sensing pixels may include an array of electric field sensing pixels, for example.

A method aspect is directed to a method of enrolling a user's finger with a finger biometric sensor that includes an array of finger biometric sensing pixels. The method may include collecting an initial plurality of enrollment finger biometric data sets from the array of finger biometric sensing pixels and generating an initial enrollment criteria based thereon. The method may also include collecting at least one additional enrollment finger biometric data set and adapting the initial enrollment criteria based thereon to define a additional enrollment criteria and flagging the initial plurality of enrollment finger data sets and the at least one additional enrollment finger data set as sufficient if the additional enrollment criteria meets an acceptance condition. The method may further include collecting further enrollment finger biometric data and adapting the additional enrollment criteria if the additional enrollment criteria fails to meet the acceptance condition.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to refer to like elements in different embodiments.

Figure 1:
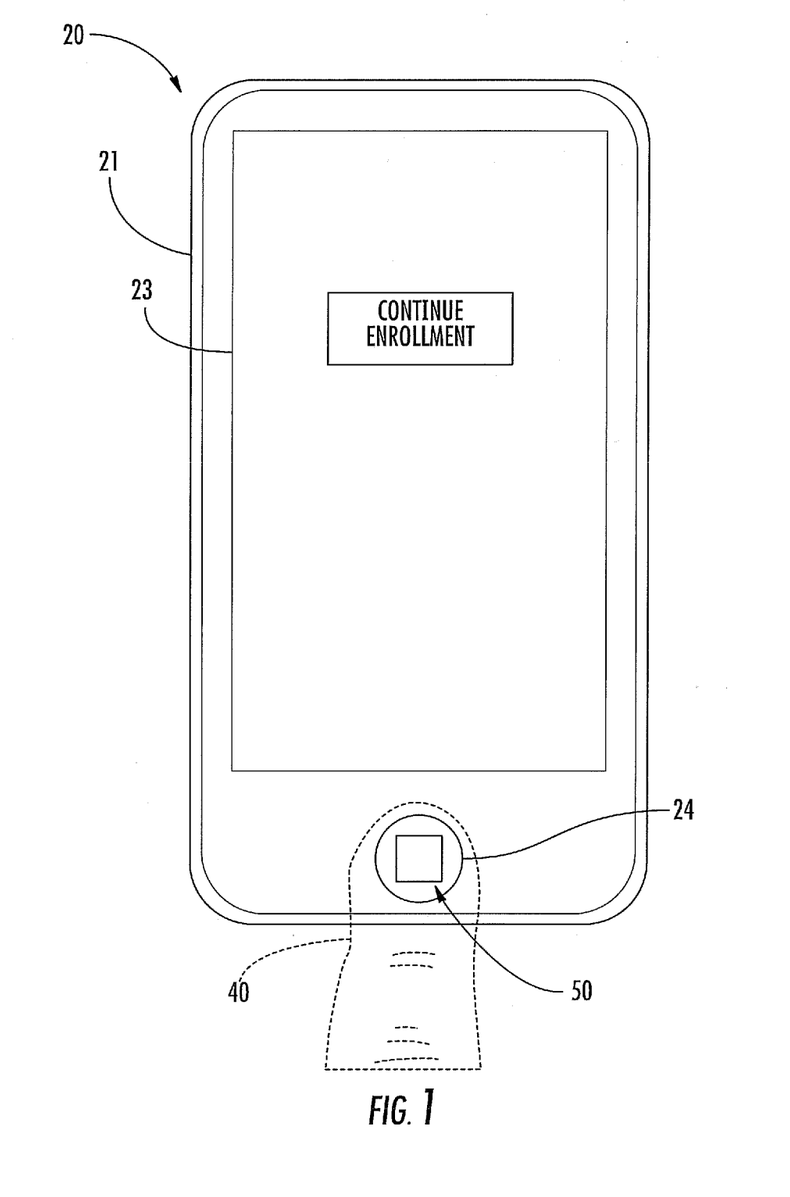
FIG. 1 is a plan view of an electronic device according to an embodiment.
Figure 2:
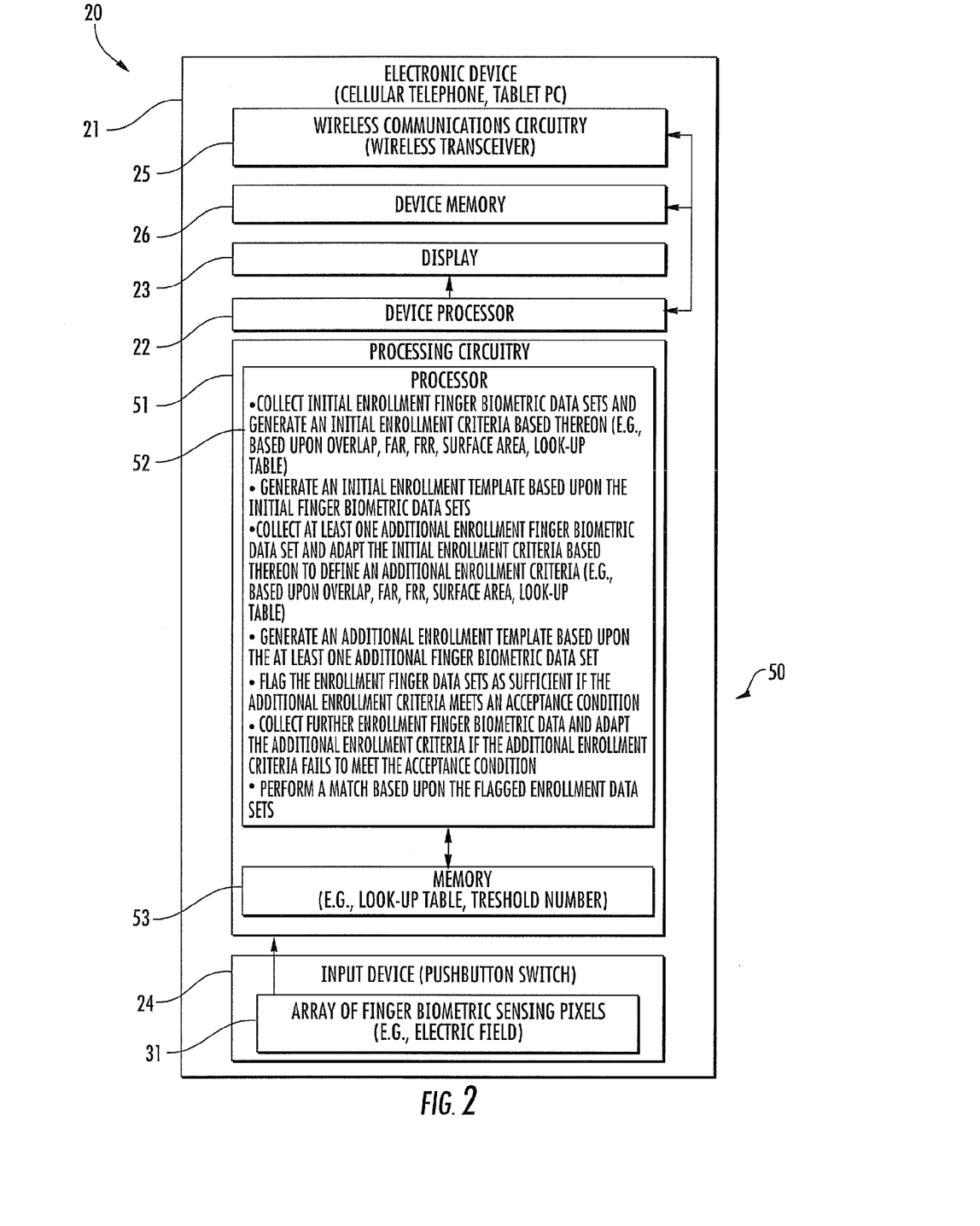
FIG. 2 is a schematic block diagram of the electronic device of FIG. 1.

Referring initially to FIGS. 1-2, an electronic device 20 illustratively includes a portable housing 21 and a device processor 22 carried by the portable housing. The electronic device 20 is illustratively a mobile wireless communications device, for example, a cellular telephone. The electronic device 20 may be another type of electronic device, for example, a tablet computer, laptop computer, etc. In some embodiments, the electronic device 20 may be an integrated circuit for use with another or host electronic device.

Wireless communications circuitry 25 (e.g. a wireless transceiver, cellular, WLAN Bluetooth, etc.) is also carried within the housing 21 and coupled to the device processor 22. The wireless transceiver 25 cooperates with the device processor 22 to perform at least one wireless communications function, for example, for voice and/or data. In some embodiments, the electronic device 20 may not include a wireless transceiver 25.

A display 23 is also carried by the portable housing 21 and is coupled to the device processor 22. The display 23 may be a liquid crystal display (LCD), for example, or may be another type of display, as will be appreciated by those skilled in the art. A device memory 26 is also coupled to the processor 22.

A finger-operated user input device, illustratively in the form of a pushbutton switch 24, is also carried by the portable housing 21 and is coupled to the device processor 22. The pushbutton switch 24 cooperates with the device processor 22 to perform a device function in response to the pushbutton switch. For example, a device function may include a powering on or off of the electronic device 20, initiating communication via the wireless communications circuitry 25, and/or performing a menu function.

More particularly, with respect to a menu function, the device processor 22 may change the display 23 to show a menu of available applications based upon pressing of the pushbutton switch 24. In other words, the pushbutton switch 24 may be a home switch or button, or key. Of course, other device functions may be performed based upon the pushbutton switch 24. In some embodiments, the finger-operated user input device 24 may be a different type of finger-operated user input device, for example, forming part of a touch screen display. Other or additional finger-operated user input devices may be carried by the portable housing 21.

The electronic device 20 includes a finger biometric sensor 50, which may be in the form of one or more integrated circuits (ICs). The finger biometric sensor 50 includes an array of finger biometric sensing pixels 31 that may be part of an IC carried by the pushbutton switch 24 to sense a user's finger 40 or an object placed adjacent the array of electric field sensing pixels. Each pixel of the array of finger biometric sensing pixels 31 may be an electric field sensing pixel as disclosed in U.S. Pat. No. 5,940,526 to Setlak et al., for example, assigned to the present assignee, and the entire contents of which are herein incorporated by reference.

The finger biometric sensor 50 also includes processing circuitry 51 coupled to the array of finger biometric sensing pixels 31. The processing circuitry 51, which may include a processor 52 and memory 53 coupled thereto, is capable of enrolling a user's finger 40. As will be appreciated, as described above, a threshold amount of finger biometric data, for example, finger biometric data having sufficient criteria that meets an acceptance criteria, is generally desirable to enroll the user's finger 40. The acceptance criteria may be met when a threshold is exceeded, for example.

One approach for determining whether the amount of finger biometric data is sufficient for enrollment is to use a minimum fingerprint area criterion. This criterion may be particularly problematic due to the wide variability of finger areas. For example, a thumb of a user is larger than his/her index finger. A thumb of a child user is much smaller than that of an adult user, and so on. For any area threshold used, a user with a finger area less than the threshold will typically not be able to enroll, whereas those with a finger area larger than the threshold might have enrollment end prematurely.

Another technique for determining whether the amount of finger biometric data is sufficient may include using a fixed number of captures. This criterion may also be particularly problematic as people with small fingers typically need fewer captures or fewer enrollment finger biometric data sets than those with large ones. Setting the target number of enrollment finger biometric data sets to a total number to enroll the "largest possible finger" would result in major user inconvenience. This is because the majority of users would need to provide many more enrollment image data sets than are really needed.

Figure 3:
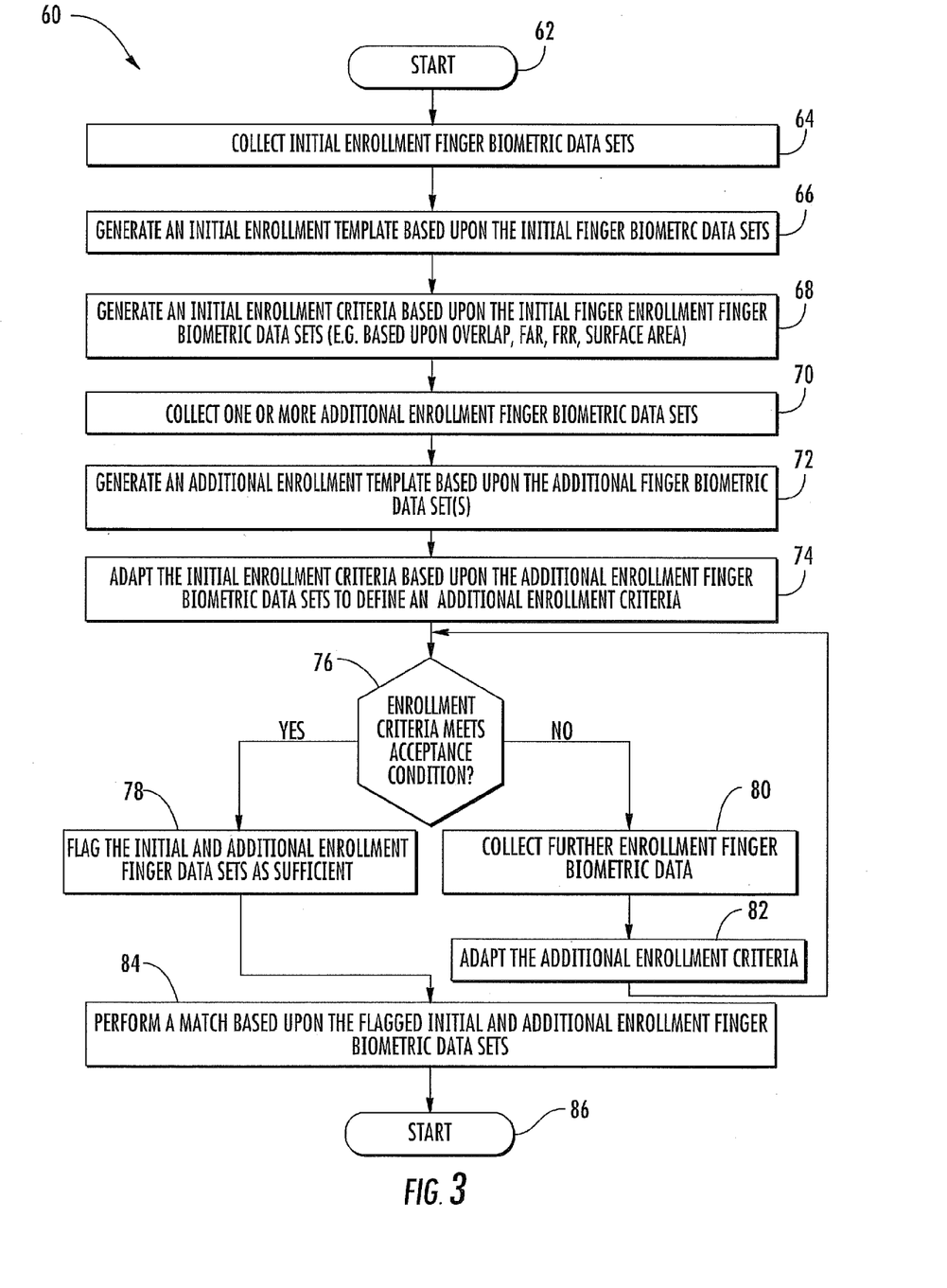
FIG. 3 is a flowchart of a method of enrolling a user's finger according to an embodiment.

Referring now additionally to the flowchart 60 in FIG. 3, beginning at Block 62, thus, to collect a sufficient amount of finger biometric data for enrollment, the processing circuitry 51 collects initial enrollment finger biometric data sets (Block 64). Each finger biometric enrollment data set may correspond to a touch of the user's finger 40 adjacent the finger biometric sensor 50. For example, the initial number may be three to five. The processing circuitry 51 generates an initial enrollment template based upon the initial finger biometric data sets (Block 66). The processing circuitry 51 also generates an initial enrollment criteria based on the initial enrollment finger biometric data sets (Block 68). The initial enrollment finger biometric data sets may be stored in the memory 53, and may correspond to a maturity of the initial enrollment template.

The processing circuitry 51 may generate the initial enrollment criteria based upon any one or more of an amount of overlap of the initial enrollment finger biometric data sets, a predicted false acceptance rate (FAR) of the initial enrollment finger biometric data sets, a predicted false reject rate (FRR) of the initial enrollment finger biometric data sets, and/or a threshold finger surface area. The initial enrollment criteria may be determined based upon a look-up table stored in the memory 53. For example, any of the amount of overlap of the initial number of finger biometric data sets, the predicted FAR of the initial number of finger biometric data sets, the predicted FRR of the initial number of finger biometric data sets, and/or the threshold finger surface area may be stored in the memory 53 with corresponding enrollment finger biometric data sets.

The processing circuitry 51 collects one or more additional enrollment finger biometric data sets (Block 70), from which an additional enrollment template is generated (Block 72).

The processing circuitry 51 adapts the initial enrollment criteria based upon the additional enrollment finger biometric data sets to define an additional enrollment criteria (Block 74).

The processing circuitry 51 may adapt the initial enrollment criteria based upon any one or more of an amount of overlap of the initial enrollment finger biometric data sets and the additional enrollment finger biometric data sets, a predicted false acceptance rate (FAR) of the initial enrollment finger biometric data sets and the additional enrollment finger biometric data sets, a predicted false reject rate (FRR) of the initial enrollment finger biometric data sets and the additional enrollment finger biometric data sets, and/or a further threshold finger surface area. The adapted initial enrollment criteria may be determined based upon a look-up table stored in the memory 53. For example, any of the amount of overlap of the initial number of finger biometric data sets and the additional enrollment finger biometric data sets, the predicted FAR of the initial number of finger biometric data sets and the additional enrollment finger biometric data sets, the predicted FRR of the initial number of finger biometric data sets and the additional enrollment finger biometric data sets, and/or the threshold finger surface area may be stored in the memory 53 with corresponding enrollment finger biometric data sets.

At Block 78, the processing circuitry 51 flags the initial enrollment finger data sets and the additional enrollment finger data set or sets as sufficient if the additional enrollment criteria meets an acceptance condition, for example, above a threshold indicative of a mature template (Block 76). In some embodiments, the acceptance condition may be met when a threshold is not exceeded.

The processing circuitry 51, at Block 80, collects further enrollment finger biometric data and adapts (Block 82) the additional enrollment criteria if the additional enrollment criteria fails to meet the acceptance condition (Block 76). In other words, if the enrollment templates are not mature, for example if the quality of the enrollment data is not sufficient, the processing circuitry 51 will continue to collect enrollment finger biometric data sets and update the enrollment criteria. Further details of generating and adapting the initial enrollment criteria and collecting additional enrollment finger biometric data sets to reach the acceptance condition to be sufficient are described below.

Figure 4A:
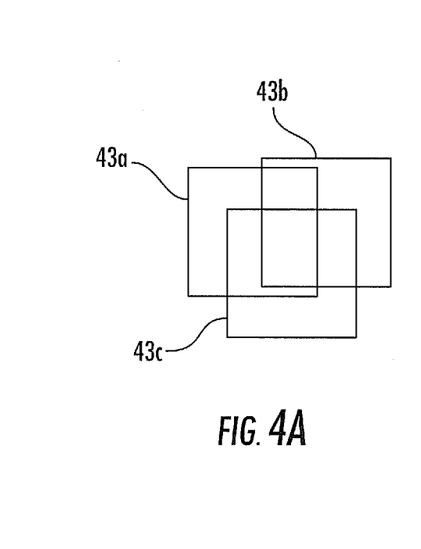
FIG. 4a is a diagram illustrating overlap of three enrollment images for a finger having a small area to be enrolled according to an embodiment.
Figure 4B:
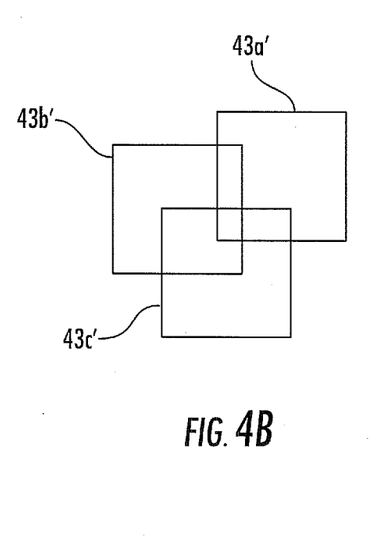
FIG. 4b is a diagram illustrating overlap of three enrollment images for a finger having a medium area to be enrolled according to an embodiment.
Figure 4C:
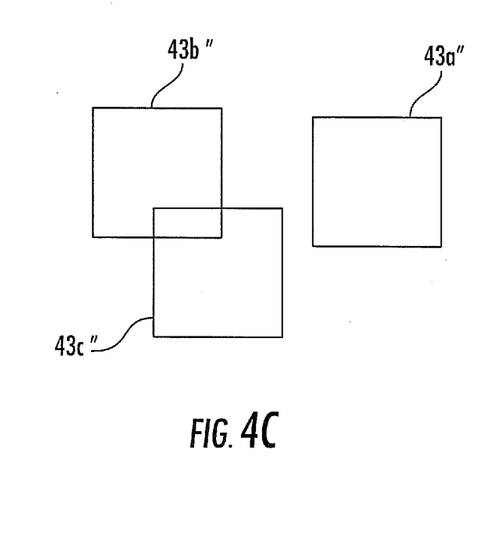
FIG. 4c is a diagram illustrating overlap of three enrollment images for a finger having a large area to be enrolled according to an embodiment.

In particular, it has been observed that at any stage of enrollment, the configuration of the enrollment data sets or generated enrollment images provides insight about the area of the user's finger 40. Referring now additionally to FIGS. 4a-4c, to illustrate this point, it may be assumed that enrollment finger biometric data sets representative of three enrollment images are captured. The relationships between these images for small, medium, and large finger areas are expected to be as shown in FIGS. 4a, 4b, and 4c, respectively. FIG. 4a illustrates the relatively small finger area resulting in a template configuration of tightly clustered images 43a, 43b, 43c. As area increases from small to medium, the images 43a', 43b', 43c' spread out as illustrated in FIG. 4b. A further increase in finger area from medium to large results in the configuration shown in FIG. 4c. Illustratively, there is little overlap between a pair of images 43b", 43c", and no overlap between the pair of images and a third image 43a". Thus, in this case, the template configuration includes two connected components. This is contrary to the first two cases when there is a single connected component.

Thus, it may be particularly desirable to exploit the dynamic characteristics of the template configuration as enrollment progresses to assess a level of template maturity (e.g., how much of finger area is covered). The assessment of template maturity may then be used to decide when to end enrollment, or more particularly, to determine the number of enrollment finger biometric data sets.

To determine if the initial and additional enrollment finger biometric data sets are sufficient, i.e., the enrollment criteria meets the acceptance condition, for example, with respect to a threshold, conceptually, the processing circuitry 51 may quantify the template configuration, quantify the template maturity, and learn a mapping between template configuration and template maturity.

With respect to quantification of the template configuration, a template may be described by a graph where nodes represent enrollment images and edges alignment information between image pairs. A template configuration can be described by a set of features describing the template graph, such as the:

Number of nodes (N);
Number of edges (E);
Number of template connected components (K);
Area of largest connected component ($A_c$);
Number of nodes of largest connected component ($N_c$); and
Number of edges of largest connected component ($E_c$)

This set of features forms a template state vector. A single feature may be referred to as a template state variable. Of course, other or additional features or template state variables may form the template state vector.

State variables may provide clues about the underlying finger area, which is generally unknown. To illustrate the use of state variables, consider two sample finger regions described in Table 1 below:

TABLE 1

| Region | Area ($mm^2$) | Bounding Box (500 dpi pixels) |
|---|---|---|
| A | 238 | 256 × 360 |
| B | 118 | 214 × 214 |

Figure 5:
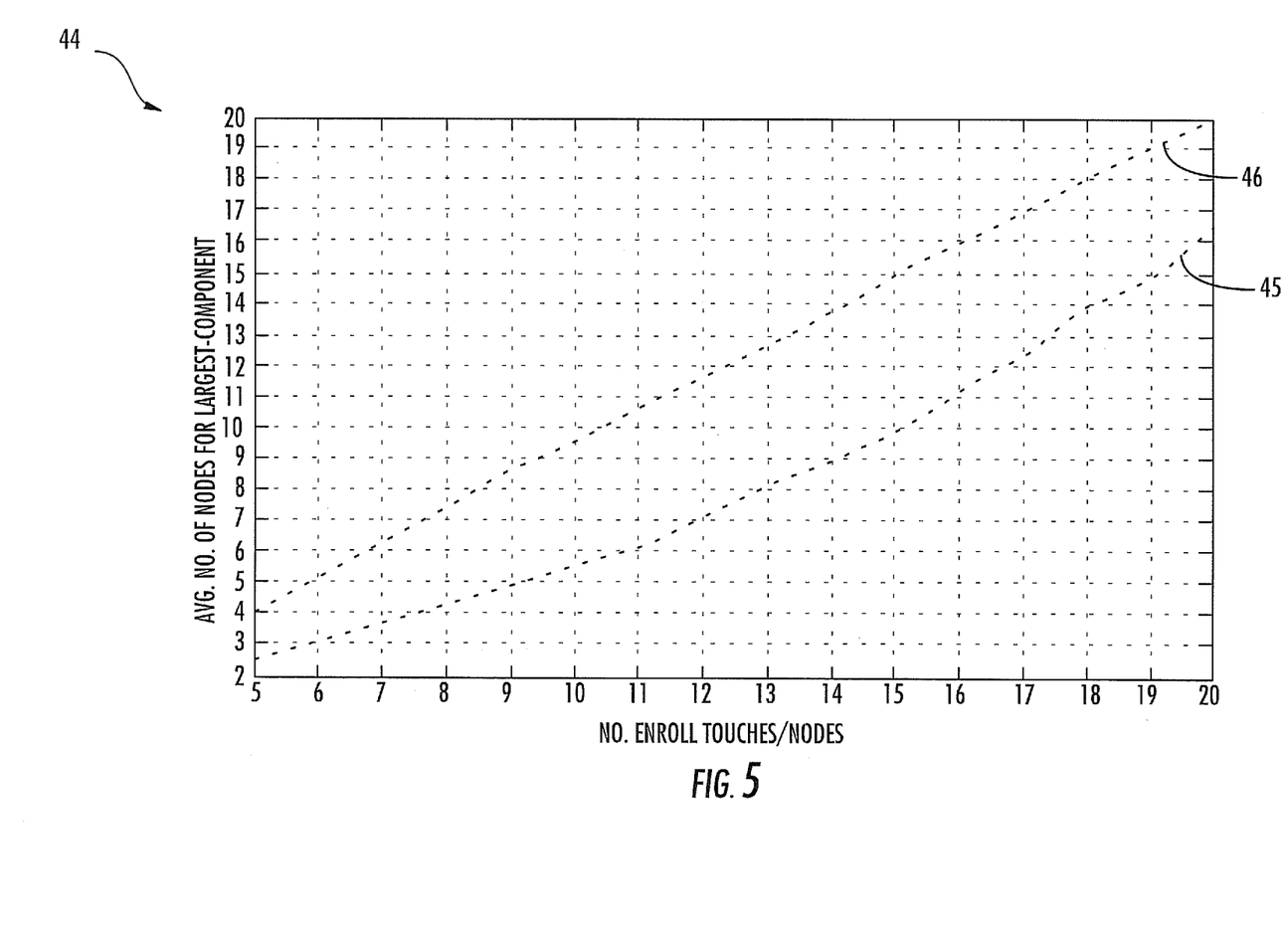
FIG. 5 is a graph of values of a state variable for two finger regions according to an embodiment.

It should be noted that region B is about half the area of region A. Simulations were conducted by randomly sampling enrollment finger biometric data sets representative of small images from enrollment finger biometric data sets representative of large images given the above two bounding boxes, and using them for enrollment. Average values of state variables were measured as a function of number of enrollment images. The graph 44 in FIG. 5 illustrates average values of $N_c$ versus number of enrollment touches or nodes for regions A 45 and B 46. As can be seen, $N_c$ is higher for the smaller region B since the likelihood of overlap is higher than that for region A.

Figure 6:
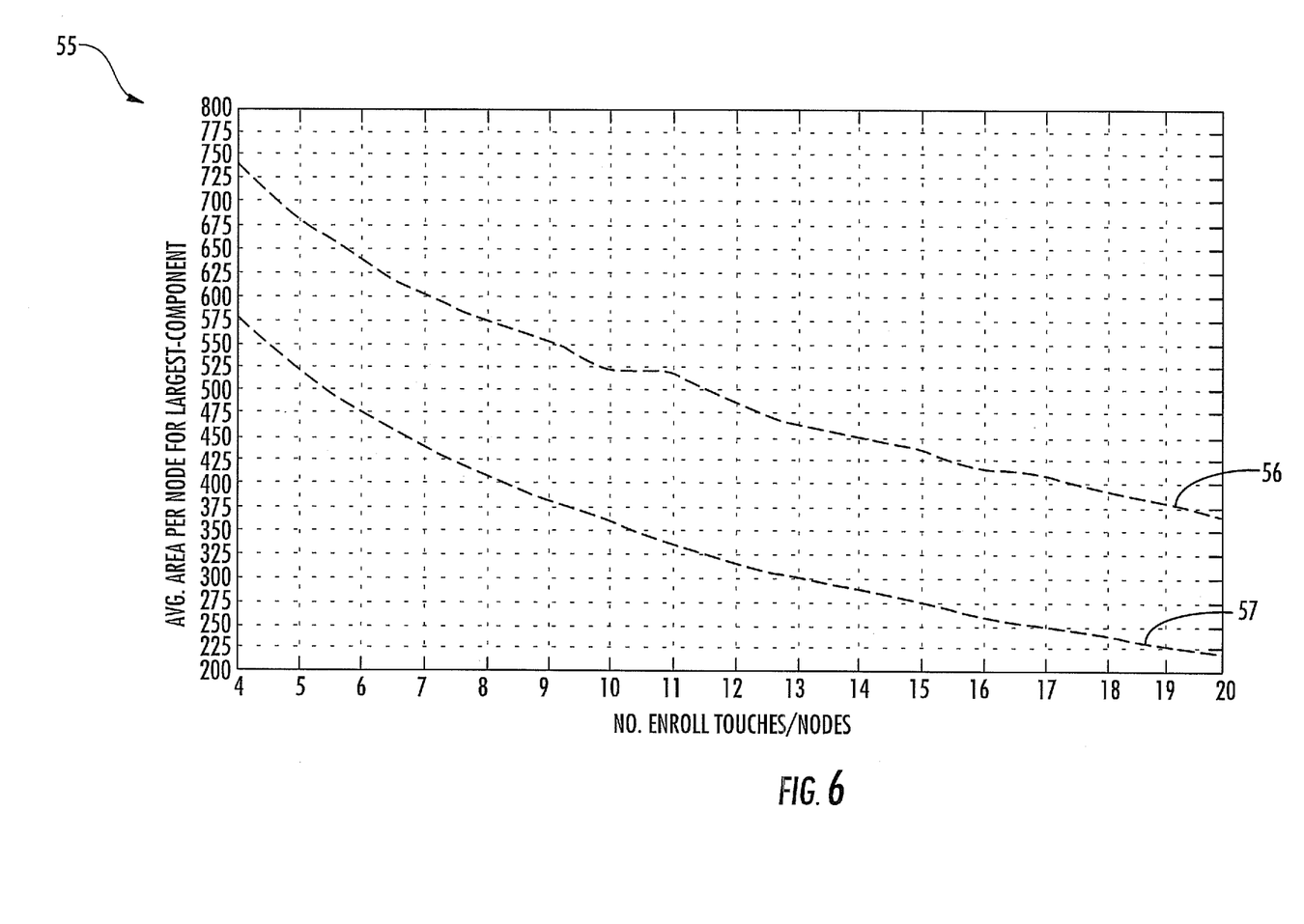
FIG. 6 is a graph of average values of another state variable for the two finger regions according to an embodiment.

Another example is for average area per node in the largest connected component, $A_c/N_c$. The graph 55 in FIG. 6 indicates that $A_c/N_c$ is considerably higher for the larger region A 56. This is because the spread of images in the largest connected component is expected to be larger than that for the smaller region B 57 (e.g., compare FIGS. 4a and 4b). In both of these examples, the state variables provide a relatively clear distinction between regions of different areas.

Figure 7:
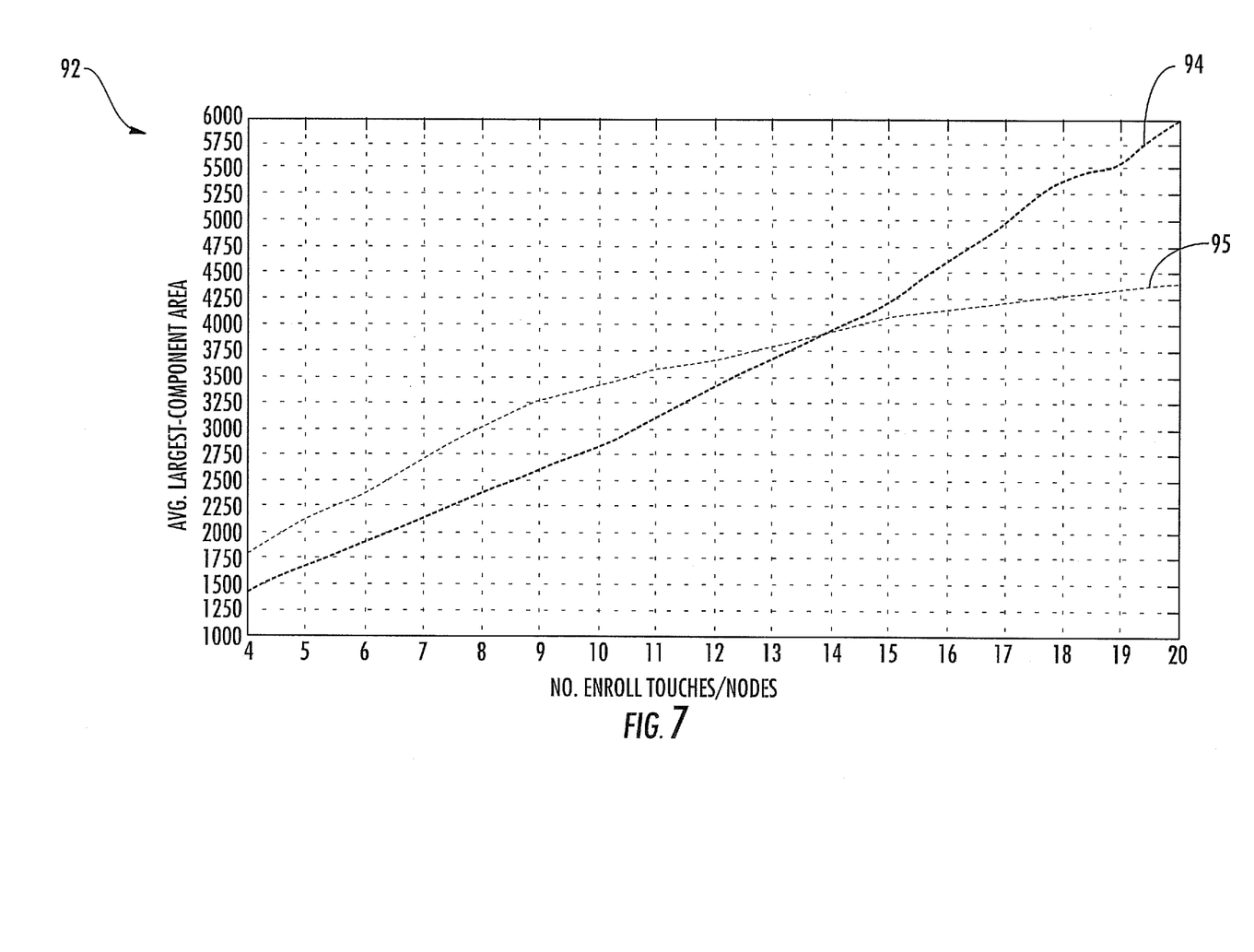
FIG. 7 is a graph of average values of another state variable for the two finger regions according to an embodiment.

It should be noted that state variables may be of a differential nature. An example of a differential state variable, denoted by $dA_c$, is one that tracks the growth of A, as enrollment finger biometric data sets representative of new images are collected. The graph 92 in FIG. 7 illustrates the average values of $dA_c$. The growth of $dA_c$ slows down after nine enrollment samples for region B 95, but continues growth for region A 94. This indicates template maturity after nine touches for area B, but not for A.

With respect to quantification of template maturity, and in the context of enrollment techniques described herein, it may be desirable to have an objective criterion that assesses the level of template maturity. This criterion can be used to determine the threshold number of enrollment finger biometric data sets, i.e., make a determination to collect additional enrollment finger biometric data sets or end the enrollment. One possible simple criterion to make this determination is the ratio between the area of largest component, $A_c$, and some target finger area, $A_F$. This criterion can be expressed as:

$$M = A_c/A_F.$$

One potential drawback with such a fixed criterion is that, as noted above, fingers vary significantly in area.

Relatively robust template-maturity criteria that are adaptive to finger area may be developed by exploiting the template state. For example, assume that the template state is described by the vector S. Given S, assume that the most likely finger area is $A_F(S)$. Thus, a potential adaptive criterion is:

$$M(S) = A_c/A_F(S).$$

Other or additional adaptive criteria may be used. For example, additional adaptive criteria may be based upon the expected False-Reject-Rate (FRR) for a given state at a target False-Accept-Rate (FAR). This is because the ultimate objective of enrollment is to ensure that the template delivered results in reduced or minimal FRR. For example, an FRR-based criterion is:

$$M(S) = -\log(FRR(S)).$$

Based upon the above-described class of adaptive template-maturity criteria through exploitation of template state, it may be particularly desirable to learn state-to-criterion mapping, $S \rightarrow M(S)$. Due to the relatively complicated nature of matcher processes, this learning may be best done through simulations, for example. Of course, other learning techniques may be used. These simulations can be done through the use of real data collected from array of finger biometric sensing pixels 31. It may be desirable that the size of the enrollment finger biometric data set be large enough to capture population variability. Simulations may also be performed using synthetic enrollment finger biometric data that may be artificially generated from an enrollment finger biometric data set of large fingerprint images.

In an enrollment session, for example, it may be increasingly desirable to provide the user with a percentage value that assesses enrollment progress. Template-maturity criteria provide a way of assessing enrollment progress. For example, if enrollment is determined to be successful when the predicted FRR reaches a certain or threshold value, $FRR_{min}$, then a possible progress value, P(S), may be represented by:

$$P(S) = \log(\max(FRR(S), FRR_{min}))/\log(FRR_{min}) * 100.$$

It should be noted that P(S) lies in the range [0,100]. Values 0 and 100 are obtained when FRR(S)=1.0, and FRR(S)<=$FRR_{min}$, respectively.

In some embodiments, the processing circuitry 51 may abort the collection of enrollment finger biometric data sets. For example, if the additional enrollment criteria does not meet the acceptance condition and continues to fall from meeting the acceptance condition, or improves in relatively small increments that are indicative of insufficient quality data (e.g., template maturity), the processing circuitry 51 will discontinue collecting of enrollment finger biometric data and adapting the additional enrollment criteria. In some embodiments, the processing circuitry 51 may discontinue collection based upon a statistical analysis of the enrollment finger biometric data, a current template state, a previous template state, whether a maximum threshold of enrollment finger data sets (i.e. attempts) has been reached, or a combination thereof. Of course, the processing circuitry 51 may discontinue collection based upon other and/or additional factors.

The processing circuitry 51 also performs a match based upon the flagged initial and additional enrollment finger biometric data sets (Block 84). More particularly, the processor 52 may determine a finger match based upon the enrollment finger biometric data sets stored in the memory 53 and the sufficient amount of generated image data. As will be appreciated by those skilled in the art, the match or generated image data may be smaller, but still having a number of matching features to provide a desired rate of matching.

In some embodiments, the processor 52 may also determine a live finger based upon spoof data. More particularly, the processor 52 may determine a live finger based upon a complex impedance and/or bulk impedance measurement. The method ends at Block 86.

In some embodiments, the processor 52 may cooperate with the array finger biometric sensing pixels 31 to perform a navigation function, for example. Of course the processor 52 may cooperate with the array finger biometric sensing pixels 31 and/or other circuitry to perform other or additional functions, as will be appreciated by those skilled in the art.

In some embodiments, the processing circuitry 51 may determine a number of additional enrollment finger biometric data sets. More particularly, the processing circuitry 51 may determine a number of additional enrollment data sets, for example, less than twenty, based upon the initial enrollment data sets. The processing circuitry 51 may also determine the number of additional enrollment data sets based upon overlap, FAR, FRR, surface area, and/or a look-up table.

It should be understood that in some embodiments, the processing circuitry 51 may be part of or included in the device processor 22. In other words, the functionality described herein with respect to the processing circuitry 51 may be performed by the device processor 22, another processor, or shared between or among processors.

A method aspect is directed to a method of enrolling a user's finger 40 with a finger biometric sensor that includes an array of finger biometric sensing pixels 31. The method includes collecting an initial plurality of enrollment finger biometric data sets from the array of finger biometric sensing pixels and generating an initial enrollment criteria based thereon, and collecting at least one additional enrollment finger biometric data set and adapting the initial enrollment criteria based thereon to define an additional enrollment criteria. The method also includes flagging the initial plurality of enrollment finger data sets and the at least one additional enrollment finger data set as sufficient if the additional enrollment criteria meets an acceptance condition, and collecting further enrollment finger biometric data and adapting the additional enrollment criteria if the additional enrollment criteria fails to meet the acceptance condition.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A finger biometric sensor comprising:
an array of finger biometric sensing pixels; and
processing circuitry coupled to the array of finger biometric sensing pixels and configured to
collect an initial plurality of enrollment finger biometric data sets, generate an initial enrollment template based upon the initial plurality of finger biometric data sets, and generate an initial enrollment criteria indicative of a quality of the initial enrollment template and based upon at least one characteristic of the initial enrollment template, the initial enrollment criteria being generated based upon a total number of nodes of the initial enrollment template representing enrollment images from the initial plurality of finger biometric data sets and a total number of edges of the initial enrollment template representing alignment information of the initial plurality of finger biometric data sets between pairs of the enrollment images,
collect at least one additional enrollment finger biometric data set, generate an additional enrollment template based upon the at least one additional enrollment finger biometric data set, and adapt the initial enrollment criteria based on the additional enrollment template to define an additional enrollment criteria indicative of a quality of the initial enrollment template and the additional enrollment template, and based upon at least one characteristic of the additional enrollment template,
flag the initial enrollment template and the additional enrollment template as sufficient if the additional enrollment criteria meets an acceptance condition, and
collect further enrollment finger biometric data and adapt the additional enrollment criteria if the additional enrollment criteria fails to meet the acceptance condition.

2. The finger biometric sensor of claim 1, wherein the processing circuitry is configured to perform a match based upon the flagged initial enrollment template and the additional enrollment template.

3. The finger biometric sensor of claim 1, wherein the processing circuitry is configured to generate the initial enrollment criteria based upon an amount of overlap of the initial enrollment template, and adapt the initial enrollment criteria based upon an amount of overlap of the initial enrollment template and the additional enrollment template.

4. The finger biometric sensor of claim 1, wherein the processing circuitry is configured to generate the initial enrollment criteria based upon a predicted false acceptance rate (FAR) of the initial enrollment template, and adapt the initial enrollment criteria based upon a predicted false acceptance rate (FAR) of the initial enrollment template and the additional enrollment template.

5. The finger biometric sensor of claim 1, wherein the processing circuitry is configured to generate the initial enrollment criteria based upon a predicted false rejection rate (FRR) of the initial enrollment template, and adapt the initial enrollment criteria based upon a predicted false rejection rate (FRR) of the initial enrollment template and the additional enrollment template.

6. The finger biometric sensor of claim 1, wherein the processing circuitry is configured to generate the initial enrollment criteria based upon a threshold finger surface area, and adapt the initial enrollment criteria based upon a further threshold finger surface area.

7. The finger biometric sensor of claim 1, wherein the processing circuitry comprises a processor and a memory coupled thereto; and wherein the memory is configured to store the initial enrollment template and the additional enrollment template.

8. The finger biometric sensor of claim 1, wherein the processing circuitry comprises a processor and a memory coupled thereto; wherein the memory is configured to store a look-up table; and wherein the processor is configured to generate and adapt the initial enrollment criteria based upon the look-up table.

9. The finger biometric sensor of claim 1, wherein the array of finger biometric sensing pixels comprises an array of electric field sensing pixels.

10. An electronic device comprising:
a housing;
a wireless transceiver carried by the housing;
an array of finger biometric sensing pixels carried by the housing; and
processing circuitry coupled to the array of finger biometric sensing pixels and configured to
collect an initial plurality of enrollment finger biometric data sets, generate an initial enrollment template based upon the initial plurality of finger biometric data sets, and generate an initial enrollment criteria indicative of a quality of the initial enrollment template and based upon at least one characteristic of the initial enrollment template, the initial enrollment criteria being generated based upon a total number of nodes of the initial enrollment template representing enrollment images from the initial plurality of finger biometric data sets and a total number of edges of the initial enrollment template representing alignment information of the initial plurality of finger biometric data sets between pairs of the enrollment images,
collect at least one additional enrollment finger biometric data set, generate an additional enrollment template based upon the at least one additional enrollment finger biometric data set, and adapt the initial enrollment criteria based on the additional enrollment template to define an additional enrollment criteria indicative of a quality of the initial enrollment template and the additional enrollment template and based upon at least one characteristic of the additional enrollment template,
flag the initial enrollment template and the additional enrollment template as sufficient if the additional enrollment criteria meets an acceptance condition, and
collect further enrollment finger biometric data and adapt the additional enrollment criteria if the additional enrollment criteria fails to meet the acceptance condition.

11. The electronic device of claim 10, wherein the processing circuitry is configured to perform a match based upon the flagged initial enrollment template and the additional enrollment template.

12. The electronic device of claim 10, wherein the processing circuitry is configured to generate the initial enrollment criteria based upon an amount of overlap of the initial enrollment template, and adapt the initial enrollment criteria based upon an amount of overlap of the initial enrollment template and the enrollment template.

13. The electronic device of claim 10, wherein the processing circuitry is configured to generate the initial enrollment criteria based upon a predicted false acceptance rate (FAR) of the initial enrollment template, and adapt the initial enrollment criteria based upon a predicted false acceptance rate (FAR) of the initial enrollment template and the at least one additional enrollment template.

14. The electronic device of claim 10, wherein the processing circuitry is configured to generate the initial enrollment criteria based upon a predicted false rejection rate (FRR) of the initial enrollment template, and adapt the initial enrollment criteria based upon a predicted false rejection rate (FRR) of the initial enrollment template and the additional enrollment template.

15. The electronic device of claim 10, wherein the processing circuitry is configured to generate the initial enrollment criteria based upon a threshold finger surface area, and adapt the initial enrollment criteria based upon a further threshold finger surface area.

16. A method of enrolling a user's finger with a finger biometric sensor comprising an array of finger biometric sensing pixels, the method comprising:

collecting an initial plurality of enrollment finger biometric data sets from the array of finger biometric sensing pixels, generating an initial enrollment template based upon the initial plurality of finger biometric data sets, and generating an initial enrollment criteria indicative of a quality of the initial enrollment template and based upon at least one characteristic of the initial enrollment template, the initial enrollment criteria being generated based upon a total number of nodes of the initial enrollment template representing enrollment images from the initial plurality of finger biometric data sets and a total number of edges of the initial enrollment template representing alignment information of the initial plurality of finger biometric data sets between pairs of the enrollment images;

collecting at least one additional enrollment finger biometric data set, generating an additional enrollment template based upon the at least one additional enrollment finger biometric data set, and adapting the initial enrollment criteria based on the additional enrollment template to define an additional enrollment criteria indicative of a quality of the initial enrollment template and the additional enrollment template and based upon at least one characteristic of the additional enrollment template;

flagging the initial enrollment template and the additional enrollment template as sufficient if the additional enrollment criteria meets an acceptance condition; and collecting further enrollment finger biometric data and adapting the additional enrollment criteria if the additional enrollment criteria fails to meet the acceptance condition.

17. The method of claim 16, further comprising performing a match based upon the flagged initial enrollment template and the additional enrollment template.

18. The method of claim 16, wherein the initial enrollment criteria is generated based upon an amount of overlap of the initial enrollment template, and the initial enrollment criteria is adapted based upon an amount of overlap of the initial enrollment template and the additional enrollment enrollment template.

19. The method of claim 16, wherein the initial enrollment criteria is generated based upon a predicted false acceptance rate (FAR) of the initial enrollment template, and the initial enrollment criteria is adapted based upon a predicted false acceptance rate (FAR) of the initial enrollment template and the additional enrollment template.

20. The method of claim 16, wherein the initial enrollment criteria is generated based upon a predicted false rejection rate (FRR) of the initial enrollment template, and the initial enrollment criteria is adapted based upon a predicted false rejection rate (FRR) of the initial enrollment template and the additional enrollment template.

21. The method of claim 16, wherein the initial enrollment criteria is generated based upon a threshold finger surface area, and the initial enrollment criteria is adapted based upon a further threshold finger surface area.

* * * * *

UNITED STATES PATENT AND TRADEMARK OFFICE
CERTIFICATE OF CORRECTION

| | | |
|---|---|---|
| PATENT NO. | : 9,135,494 B2 | Page 1 of 1 |
| APPLICATION NO. | : 14/021523 | |
| DATED | : September 15, 2015 | |
| INVENTOR(S) | : Boshra et al. | |

It is certified that error appears in the above-identified patent and that said Letters Patent is hereby corrected as shown below:

In The Claims

Column 10, Line 63
Delete: "the enrollment"
Insert: --the additional enrollment--

Column 12, Lines 19-20
Delete: "additional enrollment enrollment"
Insert: --additional enrollment--

Signed and Sealed this
Sixteenth Day of February, 2016

Michelle K. Lee
*Director of the United States Patent and Trademark Office*